(12) United States Patent
Tikhonov

(10) Patent No.: US 7,489,106 B1
(45) Date of Patent: Feb. 10, 2009

(54) BATTERY OPTIMIZATION SYSTEM AND METHOD OF USE

(76) Inventor: Victor Tikhonov, 9808 SE. Derek Ct., Happy Valley, OR (US) 97086

( * ) Notice: Subject to any disclaimer, the term of this patent is extended or adjusted under 35 U.S.C. 154(b) by 325 days.

(21) Appl. No.: 11/395,825

(22) Filed: Mar. 31, 2006

(51) Int. Cl.
*H02J 7/00* (2006.01)

(52) U.S. Cl. .................. 320/116; 320/118; 320/119; 320/120

(58) Field of Classification Search .................. 320/116, 320/119, 120, 121, 122, 125
See application file for complete search history.

(56) References Cited

U.S. PATENT DOCUMENTS

| | | | | |
|---|---|---|---|---|
| 5,818,200 A | * | 10/1998 | Cummings et al. | 320/116 |
| 5,955,867 A | * | 9/1999 | Cummings et al. | 320/107 |
| 5,982,145 A | * | 11/1999 | Eguchi | 320/128 |
| 6,014,013 A | * | 1/2000 | Suppanz et al. | 320/122 |
| 6,304,059 B1 | * | 10/2001 | Chalasani et al. | 320/118 |
| 2003/0102871 A1 | * | 6/2003 | Yudahira | 324/434 |
| 2004/0164706 A1 | * | 8/2004 | Osborne | 320/116 |

* cited by examiner

*Primary Examiner*—Bao Q Vu
*Assistant Examiner*—Nguyen Tran
(74) *Attorney, Agent, or Firm*—Mark S. Hubert

(57) ABSTRACT

The present invention relates to a microprocessor controlled battery management system that optimizes the total electrical capacity of that battery. It uses localized cell power sources that correct the capacity of the individual connected cells to achieve the maximum capacity of the battery as it acts in a synergistic series connection of cells. The microprocessor retrieves data of battery load current, cell voltage, cell temperature, and battery charger current in timed increments. Through the application of the microprocessor's algorithms, after an initial cell profiling of individual cell capacities has been performed, individual cell DC/DC converters are enabled to correct the condition of the individual cells. In this manner the battery capacity is not affected by the capacity of the weakest cell.

5 Claims, 2 Drawing Sheets

BATTERY OPTIMIZATION SYSTEM AND METHOD OF USE

FIELD OF THE INVENTION

The present invention relates to an improved battery optimization system. More specifically, it relates to a microprocessor controlled system that retrieves incremental data updates of electrical related parameters taken from each individual cell in a battery comprised of a string of series connected cells, and manages the capacity of the individual cells in the battery. With this capacity management of each individual cell, the battery's charge capacity is maximized and the battery's overall capacity is not limited by the capacity of the weakest cell.

BACKGROUND

Battery capacity is extremely critical in many industrial, commercial and medical situations but specifically in electric motorized propulsion applications. Since charging these larger capacity batteries can take considerable time, manufacturers strive to maximize the vehicle's range. Maximizing battery capacity is one of the goals of the battery optimization system.

A battery is a grouping of at least two series connected electrical storage cells. When storage cells are connected in parallel, they are still referred to as a single cell. Identical cells are only similar in their capacity, falling within their manufacturing tolerances. It is the correction of this inequality between the capacity in substantially similar cells in a battery that is the focus of this invention.

The capacity of a battery is that amount of energy measured in Ampere-Hours (AH) between the battery's fully charged state (that point where further charge cannot be put into the battery for fear of damage occurring to any cell), and the point where the battery voltage has dropped too low (below manufacturer's specified safe levels below which the cells may be permanently damaged.)

Since the electric potential or voltage (V) of a battery is the summation of the individual cells' voltages, when any cell's voltage drops, the voltage of the battery also drops by the same amount.

When charging the battery in the conventional manner with all cells connected in series, the same amount of current I flows into each cell. Assuming all cells have the same state of charge (SOC) before charging begins, once the smallest capacity cell reaches it's maximum storage capacity, or known as a 100% SOC, the charging operation must be stopped for fear of damaging that cell. The remainder of the cells never reach their 100% SOC. When operating the battery under a load in the conventional manner, the same amount of I is drawn from each of the cells until the weakest cell reaches the point where it's voltage drops or the cell has reached it's 0% SOC. When this happens the battery voltage drops to the point of inoperability and the remainder of the cells never reach their 0% SOC. Simply stated, the battery is limited in it's ability to be charged as well as it's ability to be discharged.

In theory, if all cells could simultaneously be at the same percentage of their individual capacity at all times (equal SOC's), all cells would reach fully charged at the same time and when under load all cells would reach fully discharged at the same time. In this manner, the fullest capacity of the battery could be realized. The battery would then truly be acting as a synergistic summation of the individual cells available energy.

Battery management systems having charging systems that address charging individual cells of the battery are known in the art. These monitor parameters of the individual cells during the charging mode, and when a cell reaches full (or in general any pre-determined) storage capacity, a resistive shunt is enabled, allowing the charging current to bypass that cell while the other cells remain in the charging circuit. The drawback of this system is that all of the charging current being sent to the bypassed cell is lost to resistive heat. Further, these battery management systems do not deal with equalization of the cells in the discharge mode.

This invention attempts to keep all cells of the battery at the same state of charge (SOC) at all times, whether charging or discharging under load. It performs an initial battery and cell profiling that determines the charge capacity of each cell. From that time on, the charge capacity of each cell is closely monitored and corrected as determined necessary by the main microprocessor. Unlike conventional systems, it does not attempt to do this by lowering the SOC of the highest capacity cells by shunting excess power through resistive heat losses. Rather, it uses DC/DC converters that are enabled in conjunction with a microprocessor that monitors various cell, battery and charger parameters, such that the summation of the individual cell's energies is distributed evenly between the cells and available for utilization by the battery under load. In his manner, all cells reach a state of discharge or a state of full charge at approximately the same time and the maximum capacity for a battery to do work can be realized despite the limitations of the weakest cells.

Unlike prior art systems, the balancing of energy in independent cells is not done by comparing only voltages between individual cells, but rather by equalizing the state of charge. A cell voltage in general is poor indicator of it's state of charge, although many battery management systems use it because of it's simplicity in measurement. Having different voltages within the string of cells with known different capacities may be a desirable and normal condition depending upon the cells, and equalizing the cell voltages alone may in fact render the cells out of balance of SOC. No cells are identical and if they exhibit capacity differences within their manufacturing tolerances, having different voltages after removing equal amounts of energy is natural, normal and desired, since their remaining capacities are also different. Again, equalizing voltages in such cases will unproductively disturb this balance.

Such design innovations as the present invention provides, overcome the pitfalls of the prior art and is a cost effective, simple solution that avoids the aforementioned pitfalls of the prior art.

SUMMARY OF THE INVENTION

The general purpose of the present invention, which will be described subsequently in greater detail, is to provide an economical, battery optimization or management system that will maximize battery capacity while minimizing electrical components.

It has many of the advantages mentioned heretofore and many novel features that result in a new, battery optimization system which is not anticipated, rendered obvious, suggested, or even implied by any of the prior art, either alone or in any combination thereof.

In accordance with the invention, an object of the present invention is to provide an improved battery optimization system that does not resistively shunt undesired electricity to return individual cells to a more optimally balanced state with respect to the battery's other cells.

It is another object of this invention to provide an improved battery optimization system that utilizes a minimal of components to adjust and correct individual cell capacity.

It is a further object of this invention to provide an improved battery optimization system that maximizes the capacity of a battery composed of a string of electrical storage cells by maintaining all cells at an equal state of charge with respect to each cells' own capacity.

It is another object of this invention to provide a battery optimization system that has the ability to collect, process, store and/or display/transmit data, as well as control the propulsion, charging and environmental control sub-systems preventing overdischarge, overcharge, overload over/under temperature and other dangerous conditions.

It is a last object of the present invention to provide a method of balancing individual cells to equal SOC's, independently and simultaneously for all cells through the use of individual cell local power sources in the form of isolated DC/DC converters with an automated, remote enable function.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DESCRIPTION

Figure 1:
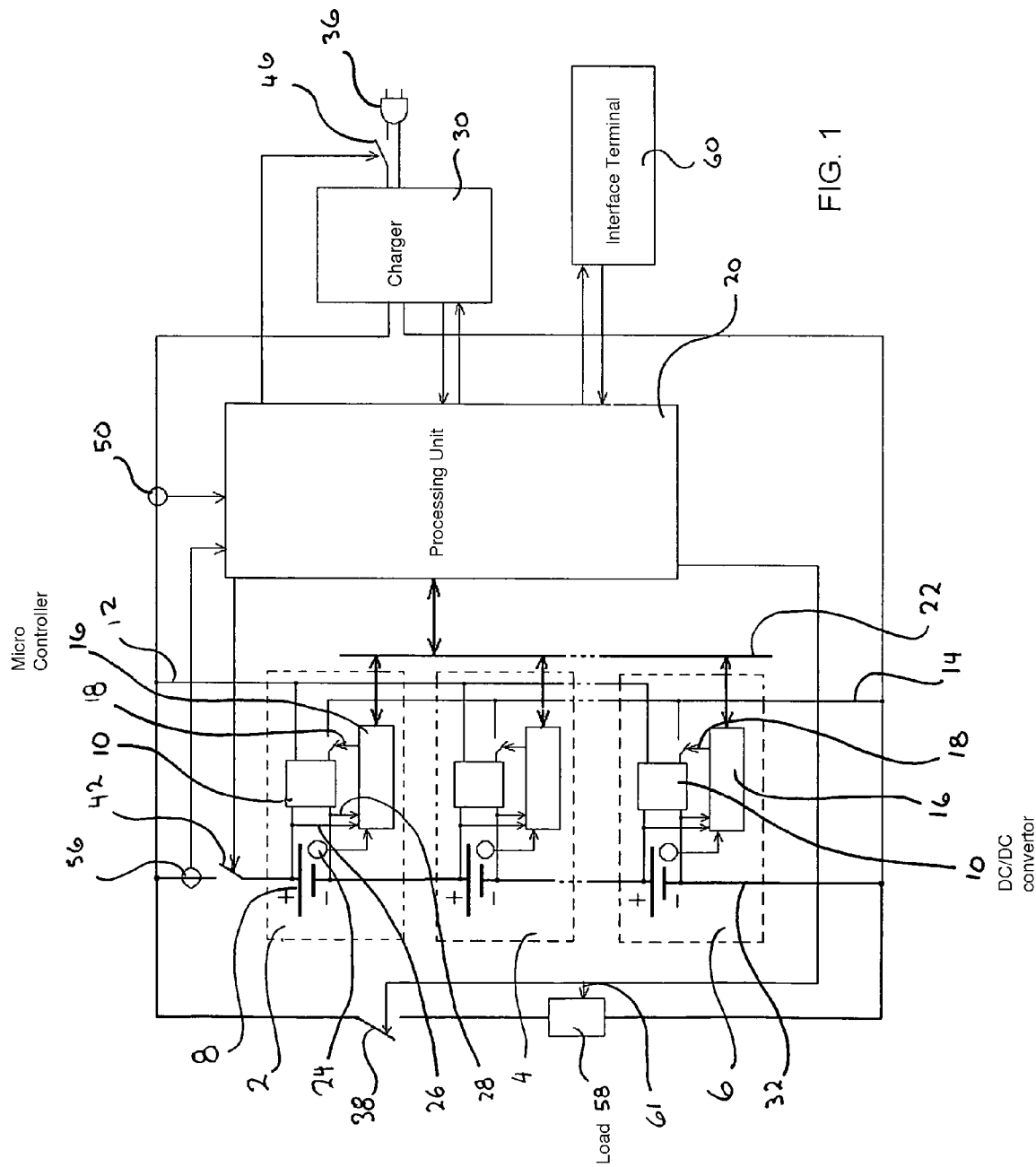
FIG. 1 is diagrammatic representation of the battery optimization system.

The present invention relates to a battery management system that optimizes the electrical capacity in each of a grouping of individual series connected cells of a battery so as to take advantage of the full capacity of the battery. It monitors the instantaneous condition of the cells and the battery, and through it's central microprocessing computer enables DC/DC converters in conjunction with the battery, to correct each cell's energy storage while in a non-charging state. The system is not intended to fix a battery problem (for instance "improve" low capacity due to manufacturing tolerances or defects in cells), but it allows the user to take full advantage of the capacity available. In a charging state the DC/DC converters work in conjunction with the current supplied from the charger. The system can selectively either increase or decrease the amount of energy stored in individual cells. Since it is capable of simultaneously charging some cells, discharging other cells and unaffecting yet other cells (using only a single DC/DC converter per cell) in effect, any one or several independent cells can be electrically removed from the series string being charged without being physically disconnected from the string, and without any dissipative energy losses as with shunting systems. This ongoing correction allows the battery to have a larger useful energy storage capacity, one that is not affected by the capacity of the weaker cells.

The present battery management system was designed for use with lithium based batteries because of their intolerance for overcharge and overtemperature conditions. When such situations occur, lithium batteries may become dangerous and subject to spectacular failures because of their very high energy density property. This is in stark contrast to the mere reduction of a lead acid battery's life or it's "quiet" electrical failure.

The present battery optimization system is intended for use with electric powered mobile devices such as cars, motorcycles, scooters, bikes, fork lifts wheelchairs, shopping scooters, motorized medical carts, indoor shuttles, and the such. The demands on the batteries used in these situations are the hardest because of the high and rapidly changing power consumption of the drive motors. However, the benefits of this battery optimization system is obviously applicable to any situation using a string of series connected cells or batteries, such as portable power tools, laptop computers, uninterruptible power supply units, stand-by or emergency power sources, etc.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings.

The invention is capable of other embodiments and of being practiced and carried out in various ways. Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Looking at FIG. 1 it can be seen that the battery is made of the series connections of the first DC cell unit 2, the second D/C cell unit 4 and the third D/C unit 6. (It must be understood that only a three cell system is shown for simplicity and easy of illustration of the principles of operation. The actual number of cells is unlimited in theory and in practical applications can reach several hundred in number). Each cell unit has a chemical storage single cell 8, a temperature sensor 24, a constant current output DC/DC converter 10 receiving one positive DC input from common DC line 12 and one negative DC input from common DC line 14, and a localized micro controller 16 which is connected to a micro controller enablement device 18 which enables DC/DC converter 10.

Micro controller 16 is connected to central processing unit 20 by data communications bus 22. The temperature sensors 24 embedded in (or externally attached to) cell 8 relay data to central processing unit 20 from micro controller 16 via data communications bus 22. Individual cell voltages as determined with input from cell positive lead 26 and cell negative lead 28 are relayed to central processing unit 20 from micro controller 16 via data communications bus 22. A battery charger 30 feeds current to the battery on battery bus 32 upon which common positive DC line 12 and common negative DC line 14 also feed. A battery charger 30, usually powered from AC source 36, receives data signals from central processing unit 20. Central processing unit 20 sends enablement signals to load switch 38, enablement signals to battery disconnect switch 42, and enablement signals to charger disconnect switch 46. The output of charging current sensor 50 is sent to central processing unit 20 and load current sensor 56 sends it's output to central processing unit 20. The user interface terminal (interaction gateway) 60 visually displays the microprocessor unit's 20 data, actions and alarms and allows input of user data, the acknowledgment of alarms and manual function control.

Electric load 58 represents the current draw from battery as it is used to convert electrical energy into mechanical or other energy. Central processing unit 20 has a processor, memory (electronic or magnetic digital storage), at least one input data port, at least one output data port, at least one set of programmed algorithmic logic instructions, a clock, and a means for cell, battery and charger signal interpretation. It is powered from the charger or from the battery itself.

A user interface 60 allows the input of data, set up or test parameters, alarm acknowledgment and manual function controls as well as for the viewing of central processing unit 20 output on a display module. It is not comprised of a specific visual design per se, but is a gateway for the user to view the content and control the actions of the system. It is not limited to any specific display technology, conduit, or protocol. As such the display module acts as a visual translation layer that helps the user interpret the data and functions of the system. An interface may include transponders or transceivers allowing remote data view, collection, exchange and control, for instance over IR or radio link, wirelesly over world wide web, and such.

Micro controller 16 has a temporary memory to store voltage value data acquired from the cell. In this manner all cell's voltages can be sampled instantaneously but relayed to the microprocessor sequentially.

Central processor unit 20 can initiate system protection alarms and functions based on input parameters. It can disable the load switch 38 to disconnect the load 58 in the event of several over temperature cells, it can alarm to notify the user of a high temperature cell, it can disable the charger disconnect switch 46 after all cells have reached a 100% SOC, it can reduce load power consumption by load control 61 or disable the load switch 38 on undervoltage. Primarily, the main processor unit 20 looks at the cell voltages and temperatures and tracks the amount of AH remaining in the cell. It also contains in non-volatile memory, initial cell profiles, cycle life data, charging profiles and charging schedules, and is capable of logging, storing and manipulating gathered data, for such feedback as capacity degradation predictions or cycle life predictions. These predictions it calculates by extrapolating trends of particular parameters and learning the rate of capacity decay (by comparing cycle-by-cycle data). Thus, the system can compensate the charging parameters, by anticipating SOC levels based on "training" (learning usage patterns compared with actual patterns) and many other tasks only limited by knowledge of battery behavior, and the computing power of the central processor unit 20.

The system can calculate and report power and energy consumption; predict running time left (and in the case of a vehicle—remaining distance); control load (for instance, slowing down a vehicle preventing deep battery discharge but still allowing the vehicle to reach a re-charging power source); generate various warnings and alarms when voltage, power consumption or SOC exceed pre-programmed levels; safely discharge defective cells for removal and replacement; interlock the drive system preventing it from energizing if the battery condition will not allow safe usage; report any unusual event by looking at deviations from learned patterns of certain conditions; reminding of scheduled preventative maintenance; perform scheduled battery profiling; allow remote communication with a vehicle (optionally via the world wide web); request battery and charging status or remaining range; or have a driver notification when the battery is full or charged enough to cover desired distance; perform delayed charging (to take advantage of lower electricity rates at night or off-peak time); and many other useful tasks not directly related to the cell balancing.

The battery optimization system operates to correct the SOC for the individual cells in the charging and discharging modes. This is done by adding or draining discrete packets of energy to or from individual battery cells, as computed by the main processing unit 20 and accomplished by enabling or disabling individual cell's DC/DC converters 10. These packets of energy can be discrete since the current output from the DC/DC converters 10 is a fixed and known value, as is the time period the central processing unit 20 has computed and enabled the DC/DC converters 10 for. However, to properly balance the SOC for individual cells, the electrical storage capacity for each cell must be known. The electrical storage capacity is the total number of AH's that a cell can safely supply between it'100% SOC, and it's fully depleted state once it's voltage has dropped to its lowest acceptable level (or a 0% SOC.) This first requires the performance of an initial cell profiling.

By taking a series of instantaneous, ongoing data measurements that are used to determine the total cumulative amount of energy that each cell has used, the main processing unit can determine each cell's SOC. The main processing unit 20 can then correct for the transient nature of an electric propulsion motor load and compute and distribute the compensating discrete packets of energy to the individual battery cells.

It is noteworthy at this point to distinguish between equalizing the SOCs of cells and equalizing the voltages on cells. While prior art has attempted to equalize cell's based on the later, the battery optimizing system described here just strives to bring cells to the same percentage of their own individual capacity. This is to facilitate the occurrence of complete charging or all cells at the approximate same time and the complete discharging of all cells at the approximate same time. Only in this way can the maximum capacity of the battery be reached.

The Profiling Mode

Since all cells have different capacities, yet have the same AH rating by the manufacturer, the first step of this battery optimization system is to determine the actual capacity of electrical energy storage (expressed in Ampere—Hours) of each cell. It is important to note that central processing unit 20 receives inputs from each of the cells simultaneously. It is also to be noted that this profiling must be repeated on a periodic basis, due to the effects aging and temperature have on the capacity of any cell. This is likely set to be performed at the same time as other routine interval battery or vehicle servicing.

Profiling must go through the processes of fully charging each cell to it's maximum capacity (100% SOC) then discharging each cell to it's fully depleted state (0% SOC) while compiling data about each cell's current and voltage, while tracking time. Both the cell charging and discharging must be done in conjunction with multiple iterations of cell capacity equalizing as described in the following method.

The charger 30 is enabled to put a known current onto the battery while the micro controllers 16 monitor the voltage on each cell and relay this to the central processing unit 20. Initially all DC/DC converters 10 are disabled. Once the first cell reaches full capacity (100% SOC) as determined by the battery manufacturer's maximum designed voltage, which is about 4.2 V for lithium cells (at room temperature) and about 2.4V for single lead acid cells (at room temperature), the central processing unit 20 adjusts the charger voltage to the same as the battery such that no current flows from the charger 30 to the battery, and signals the enablement device 18 to allow charging current to the DC/DC converters 10 on the cells that have not yet reached full capacity. The charger's current is also adjusted to output only the same amount of current as the summation of all DC/DC converter's input currents. This is done by continuously monitoring current sensor 56 and adjusting the charger's output so that no current flows into or out of battery via bus 32. This assures that the battery does not feed the DC/DC converters via lines 12 and 14 and that the charger 30 does not charge the battery via bus 32. In this way, current flows from the charger 30 to the enabled DC/DC convertors 10 and charges those cells not at 100% SOC. Basically, the charger's energy is moved into the cells that can store it. As more cells reach 100% SOC their DC/DC converters 10 are disabled and the charger current is adjusted accordingly until all cells are at 100% SOC. At this point, the initial 100% SOC condition is determined by the manufacturer's criteria which specifies the reduction of the charging current to a certain value while maximum voltage on a cell is maintained. The DC/DC converters used are designed to output known current near this value, so as soon as the maximum voltage at that current is reached, 100% SOC condition is registered.

With all cells at 100% SOC, their capacity can only be accurately determined by depleting each cell to it's 0% SOC level. With the central processing unit 20 monitoring the load and the time, each cell's capacity in A-H can be determined. Total cell depletions are accomplished in the following manner. The load is placed across the battery and energy from the battery dissipated until the first cell reaches 0% SOC. This occurs when the individual cell's voltage drops to it's lower rated limit (Vmin). The central processing unit 20 automatically disables the load 58 via the load disablement switch 38, enables the depleted cell's DC/DC converter and enables the charger 30 in a similar fashion as described above, to provide a known current to that DC/DC convertor 10 for a determined period of time (while still maintaining a voltage identical to that of the battery). Only a small packet of energy is directed to the cell, and this cell may be receiving many more such packets before this process is completed. Then the charger 30 and DC/DC converter 10 are disabled, and the load 56 is again placed across the battery. This process is repeated until the last cell reaches full depletion (0% SOC by the manufacturer's criteria,—normally specified as a minimum voltage under a certain load). Since the central processing unit 20 has been monitoring and storing voltage, currents and time, it can algorithmically determine the amount of energy that each cell can hold (A-H).

With the value of 100% SOC known for each cell, the central processing unit 20 can switch on and off DC/DC converters 10 on independent cells when the battery is under load so as to equalize the SOC for all cells. In this way, since the power for each DC/DC converter is supplied from the entire battery the present invention will orchestrate the depletion of all the electrical energy of all cells, simultaneously. Thus, the maximum amount of capacity in a string of series connected cells to form a battery can be utilized.

Accomplishing the task of using the battery's energy to correct and balance the SOC of the individual cells, requires constant data acquisition from the system. Since transient conditions vary considerably in electric propulsion motors, it is only by taking simultaneous measurements of each of the cell's parameters can it be guaranteed that the cells were under the same load condition when the data was acquired. (Prior art devices take sequential data acquisitions.) This is critical for accurate results from the execution of the central processing unit's programs.

The Charging Mode

Once the cells have been profiled, the central processing unit 20 knows how many A-H of energy to charge each cell with. As this number is reached the charger voltage and current are adjusted and specific DC/DC converters are enabled to allow the continued charging of cells that have not yet reached 100% SOC. As more cells reach 100% SOC their associated DC/DC converters are switched off. This continues until all cells are at 100% SOC. Charging can be performed at any level of the battery's capacity as the central processing unit 20 continually compiles all the parameters necessary to determine each cell's SOC at any given instant after the initial profiling has been performed.

The Discharging Mode

When the battery is under load (and is being monitored by the current sensor 56), the central processing unit 20 knows the number of AH of energy each cell has exhausted and thus know each cell's SOC in reference to their fully charged state (100% SOC). Similar to the way the battery was discharged in the profiling mode, the DC/DC converters 10 of the cells with lower SOC's are enabled to allow those cells to be charged to a higher % SOC. The main difference is that in this situation, the equalizing current comes from the battery itself not from the charger 30.

One of the novel and distinctive characteristics and advantages of the battery optimization system that set it technologically ahead of the prior art, is the system's "snapshot" sampling of all the system voltage, current and temperature parameters simultaneously. Although these parameters may be temporarily stored in the memory of the sensing or associated devices, for later sequential polling and collection by the central processing unit 20, it is the instantaneous data acquisition of cells under the same load condition that guarantees the validity of data, and thus ensures the accuracy of the system's operation.

With the current invention, cell SOC balancing is carried out without wasting power. The SOC balancing of any cell consists of either individually charging it or discharging it. Charging is always done using some form of DC/DC converter either at least one per cell or with a number of DC/DC converters that may be switchably connected to multiple cells independently.

The efficiency of this invention's process is equal to the efficiency of the DC/DC converter, which typically varies from 65%-90%. Individual discharge, however, has traditionally been performed by shunting a cell with a resistive element, thus partially or completely directing the charging current around the cell so the cell is either being discharged or is receiving less charge. Efficiency of this type if balancing is 0% as all the energy passing through the resistive element is wasted as heat. Since the balancing can keep taking place in idle mode, (neither charge or discharge, such as when a vehicle is parked) this is something that electric vehicle with a limited amount of precious energy onboard, cannot afford. This present invention's use of a step-down DC/DC converter on each cell rather than a resistor (or its equivalent), is much less energy wasteful.

One of the novel points of this arrangement is that the DC/DC converters' input currents are being supplied from the charger 30 and from the battery since the charger 30 is directly connected to the battery as well. The charger output current is monitored and can be remotely adjusted by the central processor unit 20. In this manner, lowering the charger output current below that of the battery will allow the DC/DC input current to come from the battery. Raising the charger output current above that of the battery will allow the DC/DC input current to come from the charger.

Electrical Theory

Figure 2:
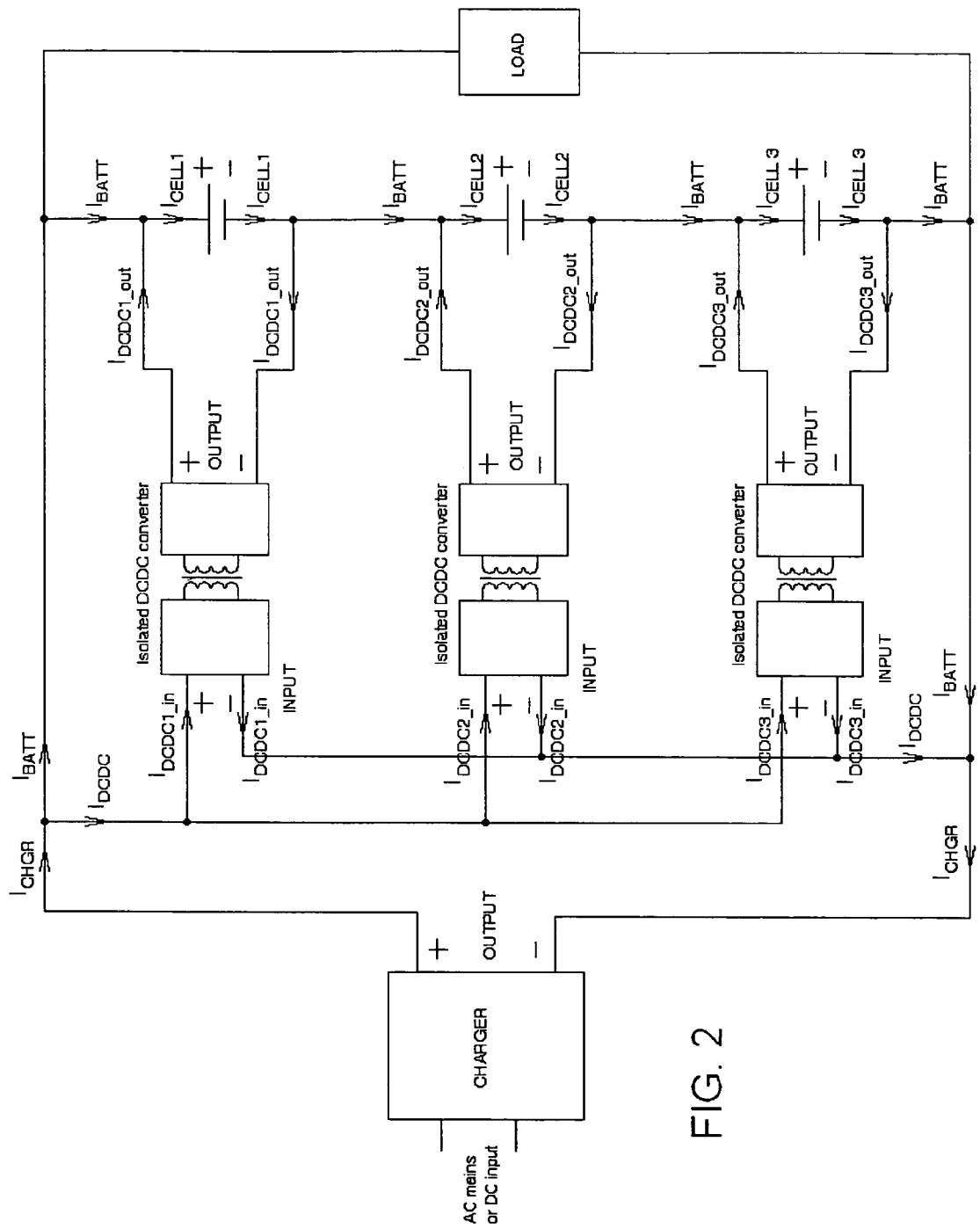
FIG. 2 is diagrammatic representation of the current and voltage parameters at various locations about a battery charging circuit utilizing individual cell DC/DC converters.

This practice of using enableable, constant current output DC/DC converters to correct cell charge capacity in the place of resistive shunting, is herein called "pseudo-shunting". The electrical theory of pseudo-shunting as applied to the above explanation can best be illustrated with reference to FIG. 2. FIG. 2 does not illustrate the operation of the microprocessor as this has already been explained, it just details the application of the electrical theory to this system.

This explanation utilizes a string of 3 cells, although the number of cells beyond 2 is not relevant to this discussion. The following parameters are designated by the accompanying symbols:

AC Mains—stationary power source input to the charger

ICHRG—output current of the charger

IBATT—current through the series connected cells (battery)

IDCDC—supply input current sum for all DC/DC converters

IDCDC1_in—input current of the DC/DC converter connected to cell 1

IDCDC1_out—output current for DC/DC converter connected to cell 1

ICELL1—current through cell 1

IDCDC2_in—input current of the DC/DC converter connected to cell 2

IDCDC2_out—output current for DC/DC converter connected to cell 2

ICELL2—current through cell 2

IDCDC3_in—input current of the DC/DC converter connected to cell 3

IDCDC3_out—output current for DC/DC converter connected to cell 3

ICELL3—current through cell 3

Pseudo-shunting is possible because the DC/DC converters are used as constant output current devices. Although the DC/DC converters do not consume constant input current, their electrical consumption can be measured and compensated for using Kirchoff's second law which states the sum of the currents entering a node must equal the sum of the currents exiting a node.

According to Kirchoff's second law $$ICHRG = IBATT + IDCDC \quad (1)$$

Also, by the same law, $$IBATT = IDCDC1\_out + ICELL1 \quad (2)$$
$$= IDCDC2\_out + ICELL2$$
$$= IDCDC3\_out + ICELL3$$

EXAMPLE 1

Assume that the efficiency of each DC/DC converter is 100%. (In reality the efficiency of DC/DC converters is not 100%, and a DC/DC converter never returns the same amount of energy it consumes. In Example 2 it will be shown that the DC/DC converter efficiency is not relevant to the principle of operation.) Further, assume the output of each DC/DC converter is a constant 3A current. When the converters are remotely enabled (turned on and off by the microprocessor unit), IDCDC_out=3A. Assume the voltage of each cell is 4V such that in this string of three cells the total battery voltage is 12V.

Traditionally, two methods have been used for charging this battery. In the conventional method the main charger is enabled and the DC/DC converters are not enabled. In this case IDCDC_in and IDCDC1_out will be 0A and ICHRG will simply be equal to IBATT and equal to ICELL1, or ICELL2 or ICELL3, since the current at any point of a circuit of series connected cells is the same. This method charges the battery rapidly since all cells are charging at the same time and at the same rate and the charger's output power can be arbitrarily high. The downfall here is that when the lowest capacity cells reach 100% SOC, which will occur first, continuing to charge the other cells could damage the lowest capacity cells and thus the whole battery. Usually, the capacity of the lowest cell dictates when the charging cycle will stop.

An arrangement where each battery has an individual small charger is called modular charging. In the proposed system, individual DC/DC converters are used as "local" chargers so it can work as a conventional modular charging system, however conventional modular charging cannot employ the pseudo-shunt method. In the described example of the pseudo-shunt method of charging, all three DC/DC converters and the main charger are enabled. The charger is adjusted by the microprocessor so that ICHRG equals IDCDC consumed by all 3DC/DC converters combined or IDCDC1_in+IDCDC2_in+IDCDC3_in. In this case the charger only supplies the DC/DC converters and no current is left for the battery from the charger (see formula 1), IBATT=0. The charging current for each cell is equal to the DC/DC converter output. All 3 cells are being charged with 3A each. The output power of each DC/DC converter is 3A*4V=12W and so is the input power of each DC/DC converter (100% efficiency assumption noted above). Since input voltage of each DC/DC converter, is equal to the battery voltage (12V), the input current of each DC/DC converter, IDCDC1_in, IDCDC2_in and IDCDC3_in, is 12W/12V=1A. All DC/DC converters have inputs paralleled, so the total input current supplied from the charger is 1A*3=3A. Up to this point, the pseudo-shunt method of charging acts like the conventional method of charging, above.

If the main charger is disconnected, the DC/DC converters will be supplied charging current from the battery itself (series connected string of cells) therein consuming 3A out of the battery or IBATT=−3A. Since for each cell IDCDC_out is 3A the net current ICELL must be zero. This is because the cell is being charged from the DC/DC converter with the same current it is being simultaneously discharged with, and it is being discharged because it has to supply energy to all three DC/DC converters.

Once there is indication that a cell has reached it's fully charged capacity, the goal would be to continue to charge the remaining cells. The traditional way would be to continue to charge the entire battery and just enable a resistive shunt around the fully charged cell, therein dissipating that cell's charging current as a heat loss. In this way just the remaining cells would be charging.

In the pseudo-shunt method, little power would be lost in continuing to charge only some of the battery's cells (none if we assume a 100% efficiency for the DC/DC converters as in this example). Assume CELL1 is the lowest capacity cell and reaches 100% SOC first. The DC/DC converters for all other cells are enabled, (in this case CELL2 and CELL3) while the DC/DC converter for CELL1 is disabled. As a result, CELL2 and CELL3 will be charged with 3A and discharged with 2A which is total current CELL2 and CELL3 have to supply for their 2 working DC/DC converters. The net charging current for their DC/DC converters becomes 3A-2A=1A. The CELL1 DC/DC converter is off, so charging current IDCDC1_in is zero, however, CELL1 is in series with the other cells and still has to supply the same 2A to feed the two cells with the enabled DC/DC converters. This means this CELL1 is discharged with 2A current—the same effect as if it was shunted with a resistor loading it to 2A. But in the case of this pseudo-shunting there was energy lost to resistive heat, rather, with this proposed arrangement the energy was taken from the cell being discharged and the DC/DC converters on the other cells deliver this energy to the charging cells (i.e. those cells not yet at 100% SOC). As can be seen in the example above, CELL2 and CELL3 are charged with 1A current each while CELL1 is discharged with 2A current.

Despite the fact that a DC/DC converter can only supply power to a cell (i.e. to charge it), the proposed arrangement allows the ability to discharge any given cell by having it supply current to run the DC/DC converters but with it's DC/DC convertor disabled. This will charge only all the other cells with their DC/DC converters enabled (thus returning charge only to them but not to the cell being discharged.)

Due to the difference in the speed of charging the cells, the main processing unit 20 has a program that utilizes the traditional method of charging until the first cell reaches a 100% SOC then automatically switches to the pseudo-shunting method to fill the remaining cells to full capacity.

In a practical implementation, the efficiency of DC/DC converters is not 100%, so a DC/DC converter never returns the same amount of energy it consumes. To compensate for DC/DC converter losses (which are known amounts for limited current output DC/DC converters), the main charger is enabled during pseudo-shunting. The charger's output ICHRG, is adjusted by the microprocessor to be just enough to supply current equal IBATT-IDCDC, thus compensating for the inefficiency of the DC/DC converters. (This of course is only possible when the mains power is available, as balancing while idling will have no such compensation). In this way the charger supplies them but not the battery. This is achieved by constantly monitoring IBATT and microprocessor adjustment of the ICHRG so that IBATT is maintained at 2 amps. This is trivial task with feed back control.

To illustrate this, assume a practical efficiency of each DC/DC converter of 80% in the above case. Thus, if the DC/DC converter supplies 3A it must consume more than 1A on it's inputs, in this case 1/0.8=1.25A. Two working converters then will consume twice as much, or 2.5A. This is the current the battery will need to supply. In this case CELL2 and CELL3 will receive 3A-2.5A=0.5A and CELL1 will be discharged (pseudo-shunted) with 2.5A of current. To restore conditions of the 100% efficient converters, the main charger can be enabled and it's output adjusted so it supplies this "compensating" current of 0.5 A.

This ICHRG current will be flowing out of the charger, DC/DC converters will be consuming 2.5A so the battery will only have to supply the remaining 2A. This matches the case with the theoretical 100% efficient DC/DC converters case of 2A pseudo-shunting current described above.

Note that although the programmed logic instructions of the central processing unit 20, although referred to in general context as a group of computer executable algorithms or instructions may be termed as programs, routines, objects, components, and data structures that perform particular tasks. Those skilled in the art will appreciate that the present invention may be practiced with other microprocessor based system configurations, including hand held devices, personal digital assistants, multiprocessor systems, microprocessor based or programmable consumer electronics, network PC's, microcomputers, mainframe computers and similar devices. In this way, the general applicability of this battery optimization system can be seen.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed.

Although the above described invention is focused on use with a Lithium based battery, it is equally applicable and can easily be adapted for a plethora of other batteries such as, but not limited to, PbA (lead Acid), NiCD (Nickel Cadmium) or NiMH (Nickel Metal Hydride) based battery chemistries.

Having thus described the invention, what is claimed as new and desired to be secured by Letters Patent is as follows:

1. A battery optimization system for determining the total electrical charge capacity of individual cells and for maintaining all cells at the same percentage of their individual charge capacity in a battery made of a number of electric cells connected in series so as to optimize the output capacity of the battery, comprising:

one fixed current output DC/DC convertor circuit per individual cell for inputting a charging current to each said cell;

one DC/DC convertor switch per individual DC/DC convertor, that when actuated, enables the input flow of electric current to said DC/DC convertor;

a charging circuit adapted for supplying charge to the battery and to each DC/DC convertor when said DC/DC convertor switch is actuated;

one charging current sensor;

one load current sensor;

one charging disconnect switch that when actuated by a third actuation signal disconnects said charging circuit from said battery;

one cell temperature sensor per individual cell;

one microcontroller unit per individual cell for measuring the voltage of said cell and the temperature from said temperature sensor of each said cell, storing and transmitting data of said cell voltage and temperature to a processing unit, and adapted for actuating said DC/DC convertor switch in response to a first actuation signal from said processing unit;

a battery disconnect switch that when actuated by a second actuation signal disconnects any load from said battery;

a processing unit that receives and analyses simultaneously taken data input from all said microcontroller units, said charging current sensor and said load current sensor, and by the application of algorithmic programs generates and sends any combination of said first actuation signal to any of said microcontroller, said second actuation signal to said battery disconnect switch and said third actuation signal to said charger disconnect switch, and adjusts the current output of said charging circuit so as to maintain all cells at the same percentage of their total electrical charge capacity; and wherein said processing unit is a microcomputer; and wherein said first actuation signal sent to any of said microcontrollers by said processing unit is determined by comparison of the present state of charge of a cell to said previously determined total electrical charge capacity of said same cell with respect to the total time and amount of current used by the battery since a last charging.

2. The battery optimization system of claim 1 further comprising a user data display interface connected to said processing unit and adapted for the input of data or algorithmic programs into said processing unit and for the display of data from said processing unit.

3. The battery optimization system of claim 2 wherein said simultaneously taken data input is sampled on a regular basis.

4. The battery optimization system of claim 1 wherein each individual electric cell can be fully charged to it's maximum electrical energy storage capacity by profiling each cell individually in said battery to determine the total stored electrical energy capacity of said cell;

periodic instantaneous sampling and transmission of all cell voltages, battery load current, and charging current to said microcomputer, calculation of the remaining energy in each cell as a percentage of said same cell's total electrical energy capacity by the application of algorithmic programs in said microcomputer analyzing the time and amount of current consumed by a load placed across said battery;

calculation of the remaining energy in battery as a percentage of battery's total electrical energy capacity by the application of algorithmic programs in said microcomputer analyzing the time and amount of current consumed by a load placed across said battery;

monitoring and comparing said percentage of the stored electrical energy capacity in each cell with said percentage of the stored electrical energy capacity in the battery;

selective connection of a fixed current output DC/DC convertor to an individual cell for inputting a charging current from said battery or from an external charging source to each said cell for a specified time period so as to keep said cell and said battery at an approximately equal percentage of stored electrical energy capacities, said selective connection accomplished by said microcomputer in response to said microcomputer's application of algorithmic programs.

5. The battery optimization system of claim 4 wherein said profiling of the individual cells to determine the total stored electrical energy capacity of said cell is accomplished by discharging each cell individually to it's fully depleted state and compiling and analyzing data of each individual cell's current and voltage with respect to time, to determine the number of ampere hours between the fully charged and fully depleted states of the cell.

* * * * *